United States Patent [19]

Paton et al.

[11] 3,944,780

[45] Mar. 16, 1976

[54] POWER SUPPLY SOURCE FOR ARC WELDING

[76] Inventors: Boris Evgenievish Paton, ulitsa Kotsjubinskogo, 9, kv. 21; Daniil Andreevich Dudko, pereulok Mechnikova, 3, kv. 7; Vasily Stepanovich Gvozdetsky, ulitsa Yakira, 20/2, kv. 38; Grigory Bagradovich Asoyants, bulvar Lesi Ukrainki, 2, kv. 16; Vladik Efimovich Sklyarevsky, ulitsa Bolshaya Zhitomirskaya, 40, kv. 3; Valentin Ivanovich Skrypnik, ulitsa Ovruchskaya, 15, kv. 3; Eduard Ivanovich Shmakov, ulitsa Krasnodarskaya, 44, kv. 60, all of Kiev, U.S.S.R.

[22] Filed: June 11, 1973

[21] Appl. No.: 368,682

Related U.S. Application Data

[63] Continuation of Ser. No. 161,486, July 12, 1971, abandoned.

[52] U.S. Cl. ........................ 219/131 WR; 219/135
[51] Int. Cl.² ............................................ B23K 9/10
[58] Field of Search ........ 219/131 WR, 131 R, 135, 219/112, 113, 114; 323/23, 25, 43.5 S; 307/107, 108

[56] References Cited

UNITED STATES PATENTS

| | | | |
|---|---|---|---|
| 3,226,578 | 12/1965 | Bengston | 307/107 |
| 3,644,699 | 2/1972 | Mescheryak et al. | 219/113 |
| 3,718,802 | 2/1973 | Manz | 219/131 WR |

Primary Examiner—Thomas J. Kozma
Assistant Examiner—G. R. Peterson
Attorney, Agent, or Firm—Haseltine, Lake & Waters

[57] ABSTRACT

A power supply source is provided for use in apparatus for the welding of workpieces. It contains several parallel-connected charge-discharge circuits connected to electrodes via a choke or resistor, each of these circuits consists of storage capacitors, elements for the switching-over of the capacitor discharge and isolating diodes with common-polarity electrodes of said diodes being interconnected and connected to the electric network via a thyristor. Such arrangement allows generating current pulses of a complex shape, including nearly rectangular shape, and provides for controlling welding thermal cycles over a wide range. The arrangement is also of a small size and weight.

8 Claims, 6 Drawing Figures

POWER SUPPLY SOURCE FOR ARC WELDING

This application is a continuation of application Ser. No. 161,486 filed July 12, 1971, now abandoned.

The present invention relates to apparatus for the welding of workpieces, and more particularly to power sources used in apparatus for the welding of workpieces.

The invention may, for example, be used in the machine-building industry.

Known power soures used in apparatus for the welding of workpieces, comprises charge-discharge circuits having a storage capacitor and switch which both are connected to electrodes via a resistor or a choke. Said power sources are not able to generate pulses of a complex shape, e.g. with the slow or fast rising of current in the middle or at the end of a pulse, so there is no possibility to control thermal cycle over a wide range. Besides, conventional power supply sources are capable of generating only relatively narrow current pulses.

At the same time, the possibility of welding by means of pulses of complex shape considerably facilitates a number of technilogical problems such as the cutting of slots in sheet metal, the welding or copper constructions and so forth.

For the welding of thin metals are required current pulses of relatively long duration or direct current with the possibility of controlling thermal cycles over a wide range.

The above said power sources must include a rectifier with a transformer which makes the power source heavier and more expensive.

An object of the invention is to eliminate the above said shortcomings.

Another object of the invention is to provide a power source capable of generating current pulses of a complex shape, including almost rectangular shape, and to provide for the control of welding thermal cycles over a wide range without utilization of a transformer and rectifier.

According to the invention, a power source, which is used in apparatus for the welding of workpieces in which a charge-discharge circuit contains a storage capacitor and an element for switching-over of the capacitor discharge and which is connected with electrodes via a choke or resistor, is provided with several parallel-connected charge-discharge circuits, each of which contains an isolating diode, with the common-polarity electrodes of said diodes being connected together and to an electric network through a thyristor.

A feature of the invention is the creation of a power source capable of generating current pulses of a complex shape, including almost rectangular shape, and providing the control of welding thermal cycles over a wide range without utilization of a tranformer (other than as a main supply) and rectifier.

Below, the invention is described by exemplary embodiments and illustrated by the accompanying drawings by which:

Figure 1:
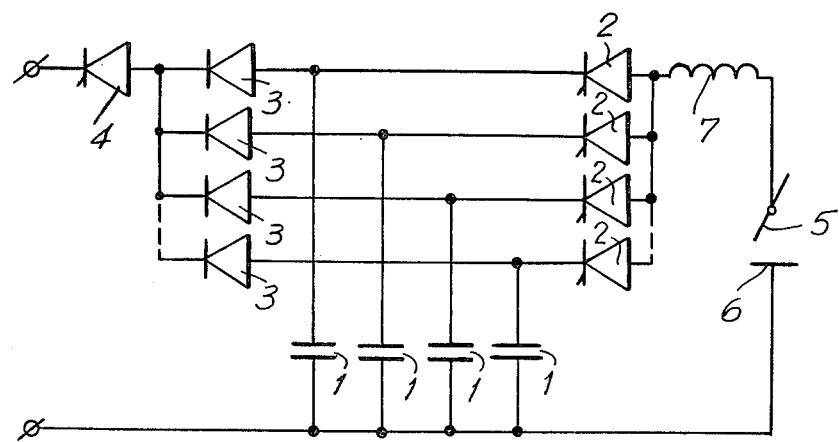
FIG. 1 is a schematic diagram of an electric power source according to the invention.

The power source used in apparatus for the welding of workpieces is provided with several charge-discharge circuits each of which contains a storage capacitor 1 (FIG. 1), an element for switching-over of the capacitor discharge, made of a thyristor 2, and an insolating diode 3.

Different polarity electrodes of the diodes 3 and thyristors 2 and one plate of the capacitor 1 in each circuit are interconnected.

The charge-discharge circuits are interconnected in parallel and connected to an electric network via the thyristor 4 and to the electrodes 5 and 6 of the welding apparatus via the choke 7. Instead of the choke 7 a resistor may be used.

Figure 2:
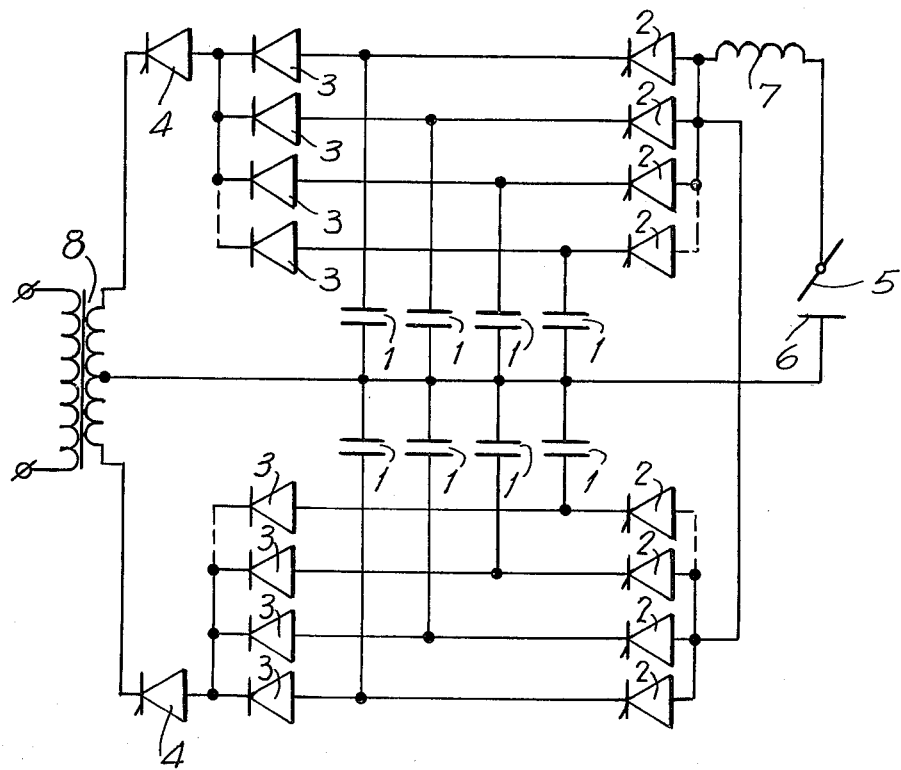
FIG. 2 is a schematic diagram of a further power supply source used for generating direct current, according to the invention.

FIG. 2 is a wiring diagram of a power source for generating current with shape near to direct-current form. The power source consists of two of the above described circuits connected to the transformer 8 as in a biphase rectifier and to electrodes 5 and 6 of the welding apparatus via a coil 7.

The power source works in the following manner.

During a negative phase of supply voltage, the thyristor 4 opens and storage capacitor 1 charges to a voltage level proportional to the phase angle of the thyristor 4. When polarity of the supply voltage changes, thyristors 2 succesively open and the voltage from capacitors 1 is applied via choke 7 to electrodes 5 and 6.

In selecting the number of storage capacitors and the time of two successive switching-on operation of thyristors 2 it is possible to generate and adjust current pulses of required width.

Figure 3:
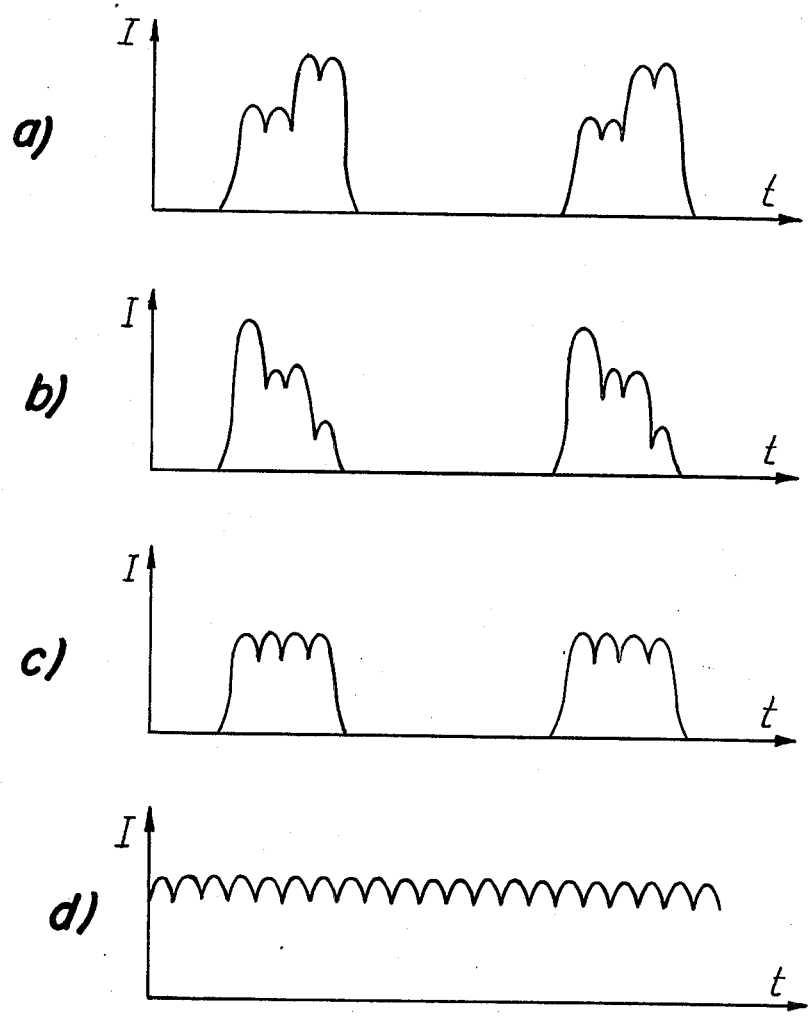
FIGS. 3a, 3b, 3c and 3d are time diagrams of currents at a supply output for explaining power source operations according to the invention.

Besides, when selecting the value of the proper capacitor or a number of capacitors, it is possible to generate current pulses of complex shape (FIGS. 3a, b) or nearly to rectangular shape (FIG. 3c).

The adjustment of pulse power (current) in the proposed power source is realized by the changing of phase angle of the thyristor 4 switching.

The isolating diodes 3 are required for the isolation of capacitors 1. The voltage between the negative plates of two corresponding storage capacitors 1 may be used to simplify the starting circuit of thyristors 2, and switching-on of the first of the thyristors 2 may be realized from electric networks when the polarity of the supply voltage is changing.

The proposed power source may be connected directly to a network without transformer and this allows to increase its efficiency and decrease overall dimensions and weight.

At the same time, the proposed power source may be fed by direct voltage. In this case it is necessary to switch-on the first of the thyristors 2 after capacitors 1 are completely charged and to repeat charging of capacitors 1 after the last of them has discharged.

The power source illustrated in FIG. 2 works in the same manner. The output current is nearly direct-current in shape (FIG. 3d).

Said power source can generate current pulses of a complex shape including nearly a rectangular shape with wide intervals of pulse width, repetition rate and attitude adjustment. It has a comparatively small size and weight and may be connected to a one-phase network directly.

What is claimed is:

1. Apparatus comprising electrodes for the welding of workpieces, a power supply network, a plurality of charge-discharge circuits connected in parallel; an impedor for connecting said charge-discharge circuits to one of said electrodes, the other of said electrodes being connected to said power supply; a thyristor for connecting said charge-discharge circuits to said network; each of said charge-discharge circuits including a diode, a storage capacitor and a thyristor; said diode and the latter said thyristor including and being interconnected by electrodes a of opposite polarity which are further connected to said capacitor, said diode and the latter said thyristor having further electrodes respectively connected to the first said thyristor and said impedor, said capacitor further being coupled to said network.

2. A power source as claimed in claim 1 wherein said impedor is a choke.

3. A power source as claimed in claim 1 wherein the first said thyristor and the diode and thyristor of each of said circuits are connected in series between one of the said electrodes and said network with the thyristors being polarized in the same direction.

4. A power source as claimed in claim 1 comprising two groups of said circuits connected in parallel.

5. A power supply source for the welding of a workpiece and operable from an A.C. supply and comprising electrodes one of which is a workpiece to be welded, said electrodes being spaced from each other to form a spark gap; a plurality of charge-discharge circuits, each of which consists of a diode, a storage capacitor and a thyristor, said diode and said thyristor being interconnected at a junction in opposite polarity and the junction being connected to said storage capacitor, the storage capacitors of said charge-discharge circuits being connected in parallel to the workpiece being welded and to the A.C. supply, said diode being connected to said supply and said thyristor being connected to the other of said electrodes.

6. A power supply source as claimed in claim 5 comprising an impedor, the thyristors of the charge-discharge circuits being connected in parallel to the said impedor and by the impedor to the other of the electrodes.

7. A power supply source for welding and operable from an A.C. supply and comprising electrodes, one of which is a workpiece to be welded, said electrodes being spaced from each other to form a spark gap; a plurality of charge-discharge circuits, each of which includes a diode, a storage capacitor and a thyristor, the diode and thyristor of each charge-discharge circuit being interconnected at a junction with opposite polarity and the said junctions being connected to the associated storage capacitor, a further thyristor, the diodes of said charge-discharge circuits being in parallel and connected in series to said further thyristor and by the latter to the A.C. supply, the first said thyristors being coupled to one of said electrodes, the capacitors being coupled to the other of said electrodes.

8. A welding power source operable from a pair of A-C terminals and comprising electrodes, one of which is a workpiece to be welded, said electrodes being spaced to form an arc gap; a plurality of charge-discharge circuits, each of said circuits consisting of a diode including an anode and cathode; a storage capacitor including two plates and a thyristor including an anode and cathode; the anode end of said diode interconnected with the cathode of said thyristor, the junction between the diode and thyristor being connected to one of the plates of said storage capacitor; the other plates of the storage capacitor of each of said charge-discharge circuits being connected together and coupled to the electrode formed by the workpiece being welded and to one of the A-C terminals; another thyristor for supplying said storage capacitor with predetermined amount of charging energy and including an anode and cathode, the anode of the latter said thyristor being connected to the cathodes of the diodes of said charge-discharge circuits, and the cathode being connected to the other A-C terminal; and an impedor having one end connected to the anode ends of the thyristors of said charge-discharge circuits and the opposite end thereof being connected to the other of said electrodes.

* * * * *